United States Patent [19]
Kapich

[11] Patent Number: 5,427,508
[45] Date of Patent: Jun. 27, 1995

[54] ELECTRO-PNEUMATIC BLOWER

[76] Inventor: Davorin Kapich, 3111 Serrano Dr., Carlsbad, Calif. 92009

[21] Appl. No.: 72,431

[22] Filed: Jun. 7, 1993

[51] Int. Cl.$^6$ ............................................. F04B 17/00
[52] U.S. Cl. .................... 417/374; 417/406; 415/202
[58] Field of Search ................ 417/374, 406; 415/202

[56] References Cited

U.S. PATENT DOCUMENTS

| | | | |
|---|---|---|---|
| 2,971,333 | 2/1961 | Mendelsohn et al. | 415/202 |
| 3,809,493 | 5/1974 | Pilarczyk | 417/374 |
| 4,077,748 | 3/1978 | Pötz | 417/374 |
| 4,080,787 | 3/1978 | Biggs, Jr. et al. | 415/202 |
| 4,135,253 | 1/1979 | Reich et al. | 415/202 |
| 4,232,991 | 11/1980 | Gamell | 415/202 |
| 5,013,214 | 5/1991 | Kapich | 415/202 |
| 5,120,194 | 6/1992 | Nichols | 415/202 |

Primary Examiner—Richard A. Bertsch
Assistant Examiner—Peter Korytnyk
Attorney, Agent, or Firm—John R. Ross

[57] ABSTRACT

An electro-pneumatic blower having an electric motor drive and a set of centrifugal blower blade and a set of compressed air turbine blades, both sets being an integral part of a single blower turbine wheel which is mounted on the shaft of the motor. A preferred embodiment is a 30 pound portable unit which which has been tested at flows of 250 CFM at 6.6 inches water gage pressure rise when driven by a 0.5 HP, 3600 RPM electric motor. The blower provides flows of 375 CFM at 13 inches water gage pressure when driven by a compressed air turbine at 80 psig. The compressed air turbine blades in this embodiment are cast along with the blower blades as parts of a single blower-turbine wheel.

6 Claims, 6 Drawing Sheets

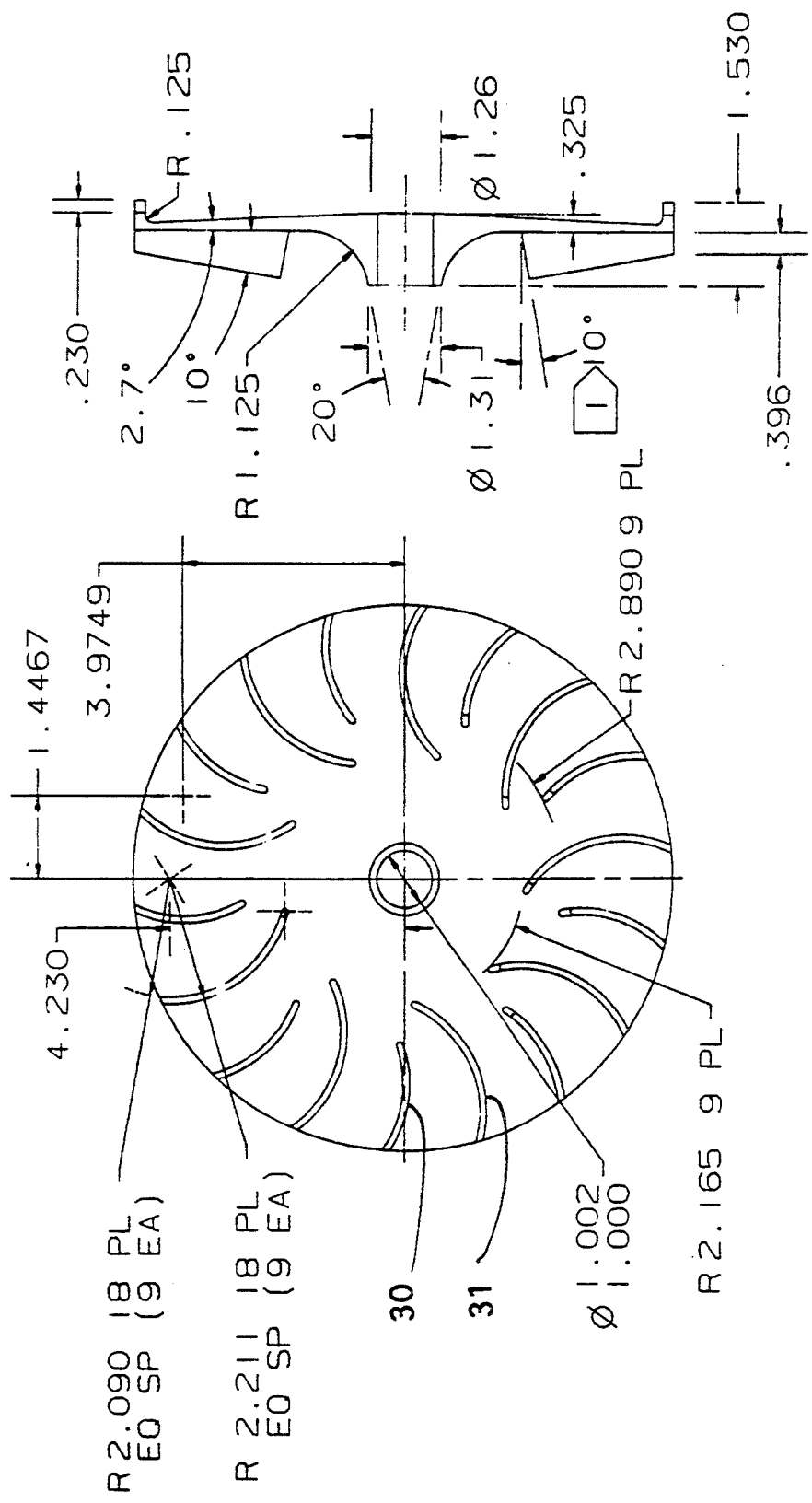

ELECTRO-PNEUMATIC BLOWER

This invention relates to blowers and fans and in particular to compressed air driven fans.

BACKGROUND OF THE INVENTION

Blowers (sometimes referred to simply as fans) in the power range of about 1 horsepower to up to about 10 or 15 horsepower are used extensively in industry for general ventilation and in fire fighting. Most such blowers are driven by electric motors or gasoline engines. The applicant invented and patented a water driven blower (Kapich, U.S. Pat. No. 5,121,124 issued Jun. 9, 1992), designed to be driven by the water in fire hoses, which has been extremely successful commercially and the United States Navy is currently in the process of purchasing one of these blowers for every ship locker for every major ship in the United States Navy. It is also known that blowers in this power range can be driven effectively by high pressure air. The applicant has invented a quiet air driven fan (Ser. No. 07/750,272) with axial fan blades and air turbine blades mounted on the hub of the fan blade.

Blowers are often purchased for emergency use, for example, fighting fire or smoke or fume control or personnel ventilation. It is not unusual in such situations to lose electric power source or to lose a compressed air source. Often both such sources are lost but in many cases one of either compressed air or electricity will be available.

SUMMARY OF THE INVENTION

The present invention provides blower having an electric motor drive and a set of centrifugal blower blade and a set of compressed air turbine blades, both sets being an integral part of a single blower turbine wheel which is mounted on the shaft of the motor. A preferred embodiment is a 30 pound portable unit which has been tested at flows of 250 CFM at 6.6 inches water gage pressure when driven by a 0.5 HP, 3600 RPM electric motor. The blower provides flows of 375 CFM at 13 inches water gage pressure when driven by a compressed air turbine at 80 pig. The compressed air turbine blades in this embodiment are cast along with the blower blades as parts of a single blower-turbine wheel.

BRIEF DESCRIPTION OF THE DRAWINGS

FIGS. 4A and 4B are two views of the blower-turbine wheel for the above embodiment.

DETAILED DESCRIPTION OF PREFERRED EMBODIMENTS

Figure 6B:
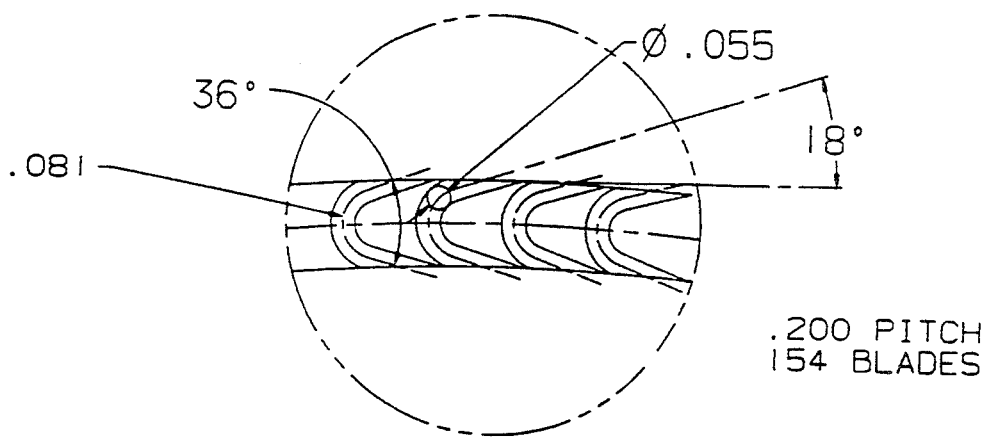
FIG. 6A and 6B are two views showing how the turbines blades of the above embodiment are fabricated.
Figure 6A:
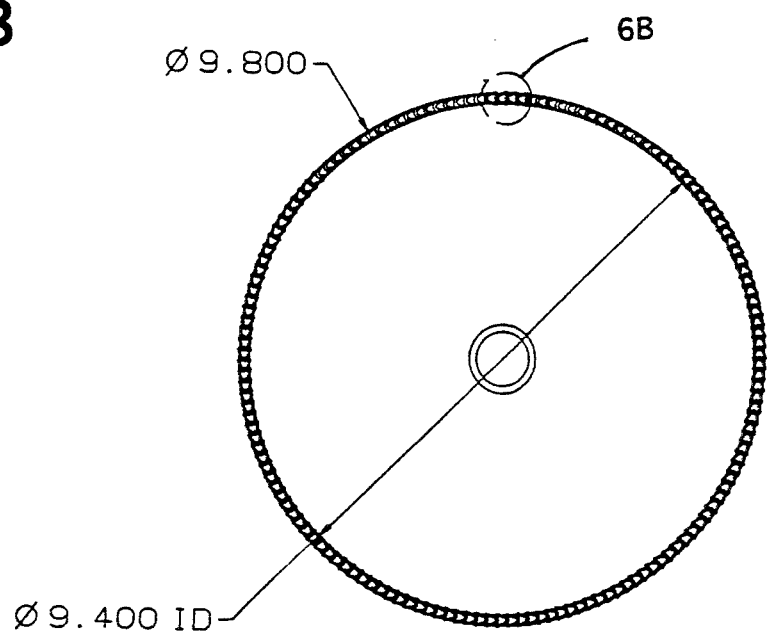

A preferred embodiment of the present invention is described by reference to the figures. The blower 8 comprises a housing 11 comprising of a generally toroidally shaped exhaust duct with a 4-inch diameter exhaust pipe 25 and inlet pipe 26. The housing 11 is divided into a front part 3 and back part 4 and is joined by bolts as shown at 5 and 6. Motor 10 is attached to housing 11 by 8 machine screws as shown at 7. Motor 10 is a 0.5 horsepower motor (Model 4409316409) supplied by Franklin Electric of Chicago, Ill. It is a standard 110 volt, 3600 RPM explosion proof electric motor and similar motors are available from many other suppliers. A blower-turbine wheel 22 is mounted on the 1-inch diameter external extension of the motor shaft 21. The dimensions and details of the blower-turbine wheel are shown in FIGS. 4A and 4B. The wheel is preferably cast in a single aluminum cast. It comprises 9 short blades 30 and 9 long blades 31 which are shown in FIG. 4A and FIG. 4B. These are centrifugal blades of a design which is well known in the blower art. The wheel also comprises 154 compressed air turbine blades 14 as shown in FIGS. 1, 2, 4B, 6A and 6B. The turbine blades 14 are intentionally made small in order to minimize the turbine windage losses when the blower is driven by the motor. An enlarged detail drawing of a portion of the blade circle showing the shape of the blades is shown in FIG. 6A. The blades are 0.23 inches high and define an angle of 36 degrees between the directions of the leading and trailing edges of the blades as shown in FIG. 6B. The blades are on a 0.2-inch pitch on a 9.8-inch diameter blade circle. Attached to the housing 11 is a 1-inch diameter compressed air inlet pipe 19 which feeds a compressed air turbine inlet plenum 20, as shown on FIG. 1. Compressed air nozzle 15 permits compressed air to expand out of plenum 20 toward turbine blades 14 as shown in FIG. 3. The centerline of nozzle 15 has a direction of 15 degrees relative to the tangent to the turbine blade circle as shown in FIG. 3. The blades are designed so that at rated output the compressed air enters the turbine blades smoothly. The compressed air exits the turbine blades into compressed air turbine exhaust channel 17. The turbine exhaust is turned 90 degrees in exhaust channel 17 and exits into toroidally shaped exhaust passage 42.

The blower may be driven by either the electric motor 10 or by compressed air entering inlet pipe 19. At standard atmospheric conditions the 0.5 HP motor operating at 3600 RPM will produce 250 CFM at a pressure difference of 6.6 inches water gage. With 80 pig compressed air, the blower will operate at 5400 RPM to produce 375 CFM with a pressure rise of 13 inches water gage.

Figures 5A, 5B:
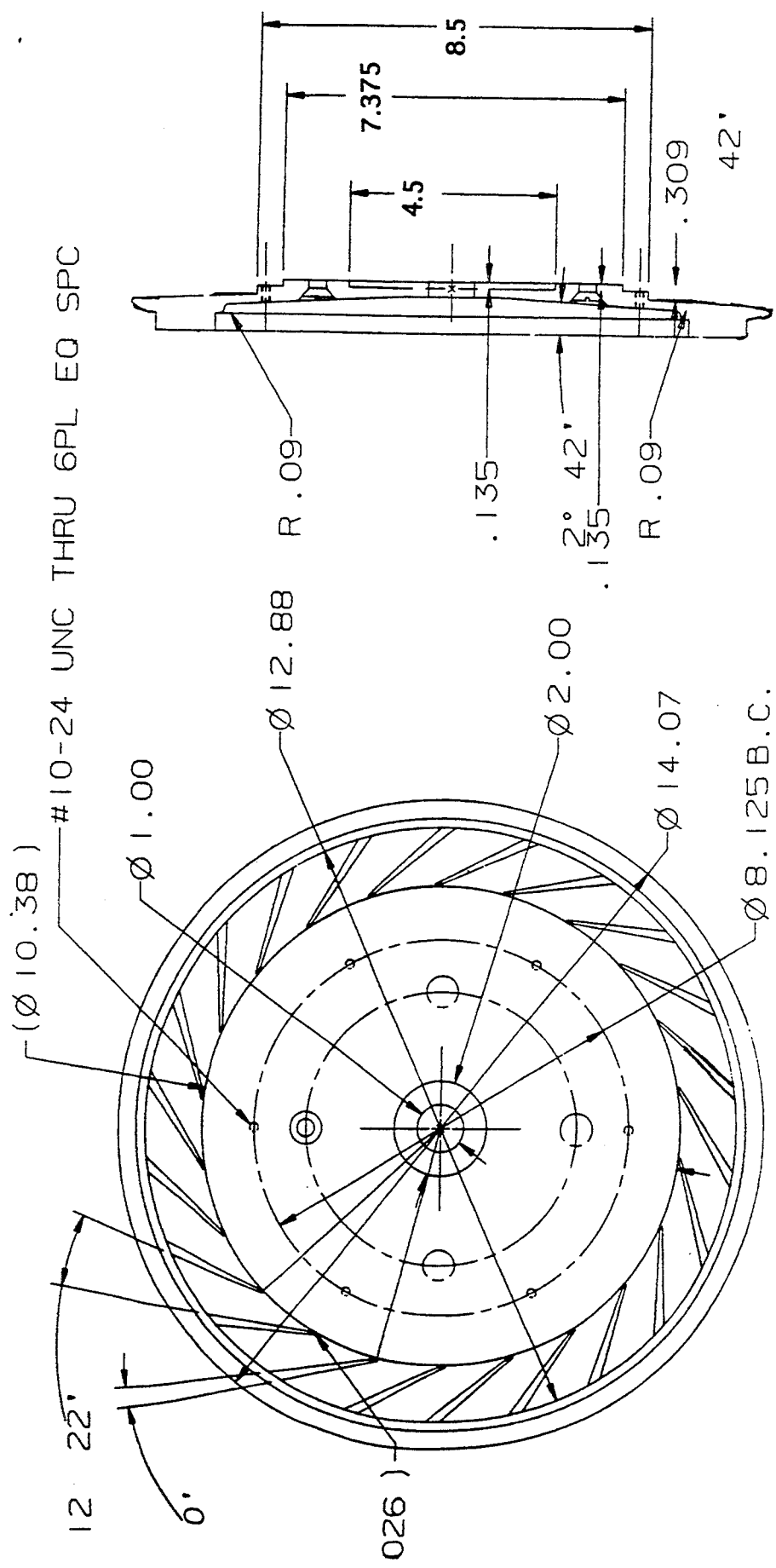
FIGS 5A and 5B are two views of showing the dimensions of the blower stator vane piece of the above embodiment.

Air is sucked into inlet pipe 26 and is driven centrifugally by blades 30 and 31 through 21 stator vanes 16 equally spaced around the tip of blades 30 and 31. Stator vanes are angled on a circular vane piece as shown in FIG. 5A to direct the air driven by blades 30 and 31 through passage 40 into the air space within exhaust passage 42.

Figure 1:
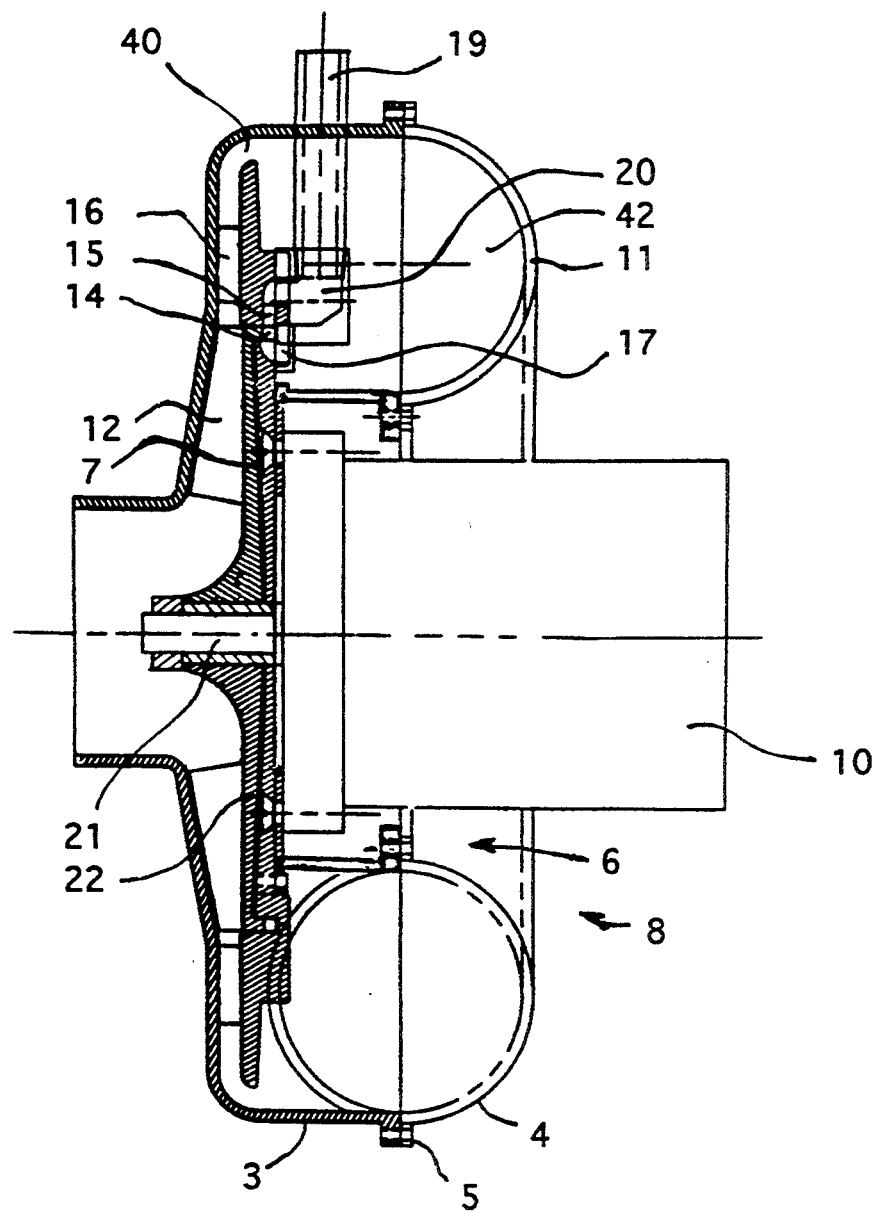
FIG. 1 is a drawing, part in cross section, of a preferred embodiment of the present invention.
Figure 2:
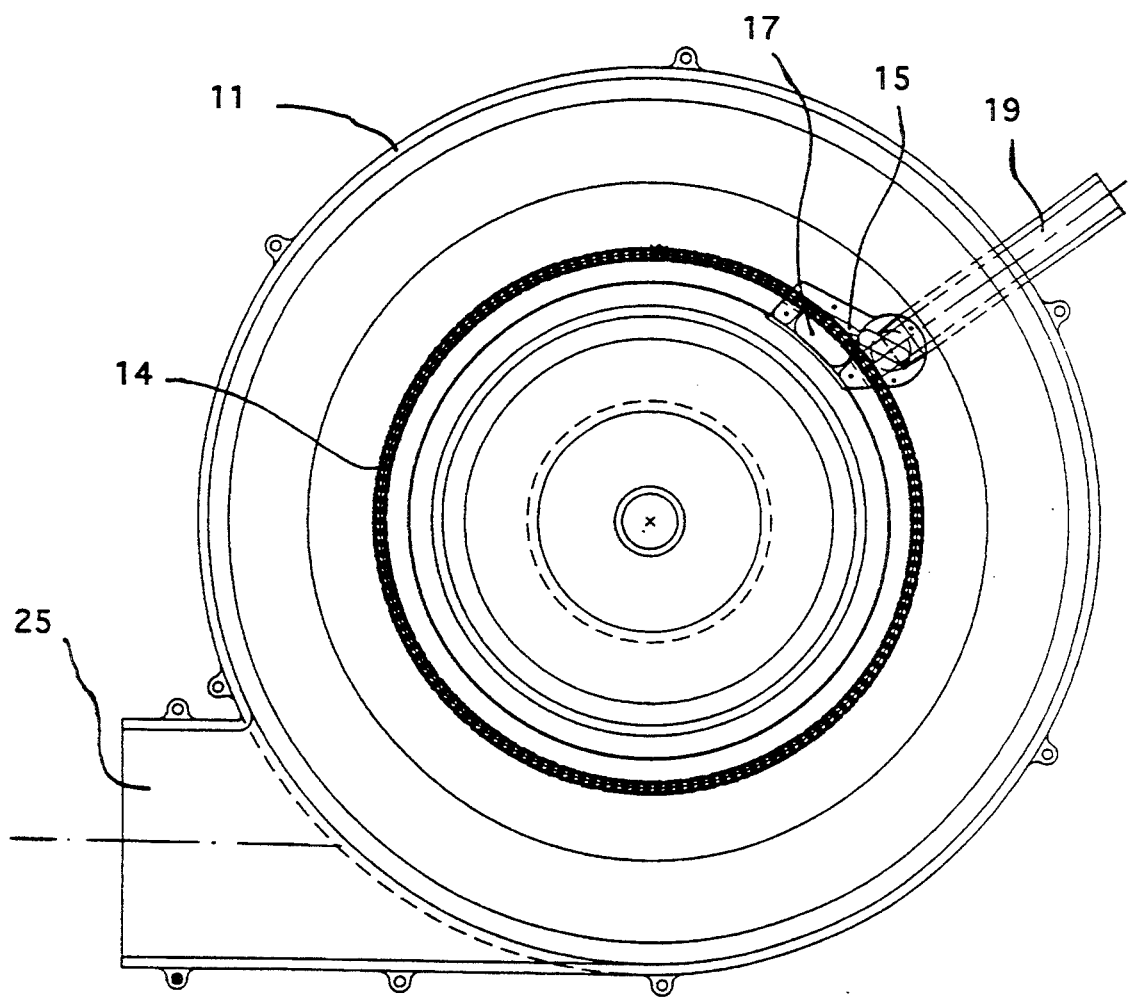
FIG. 2 is a view of the above embodiment showing the relationship of a compressed air turbine nozzle to a set of compressed air turbine blades and blower discharge.
Figure 3:
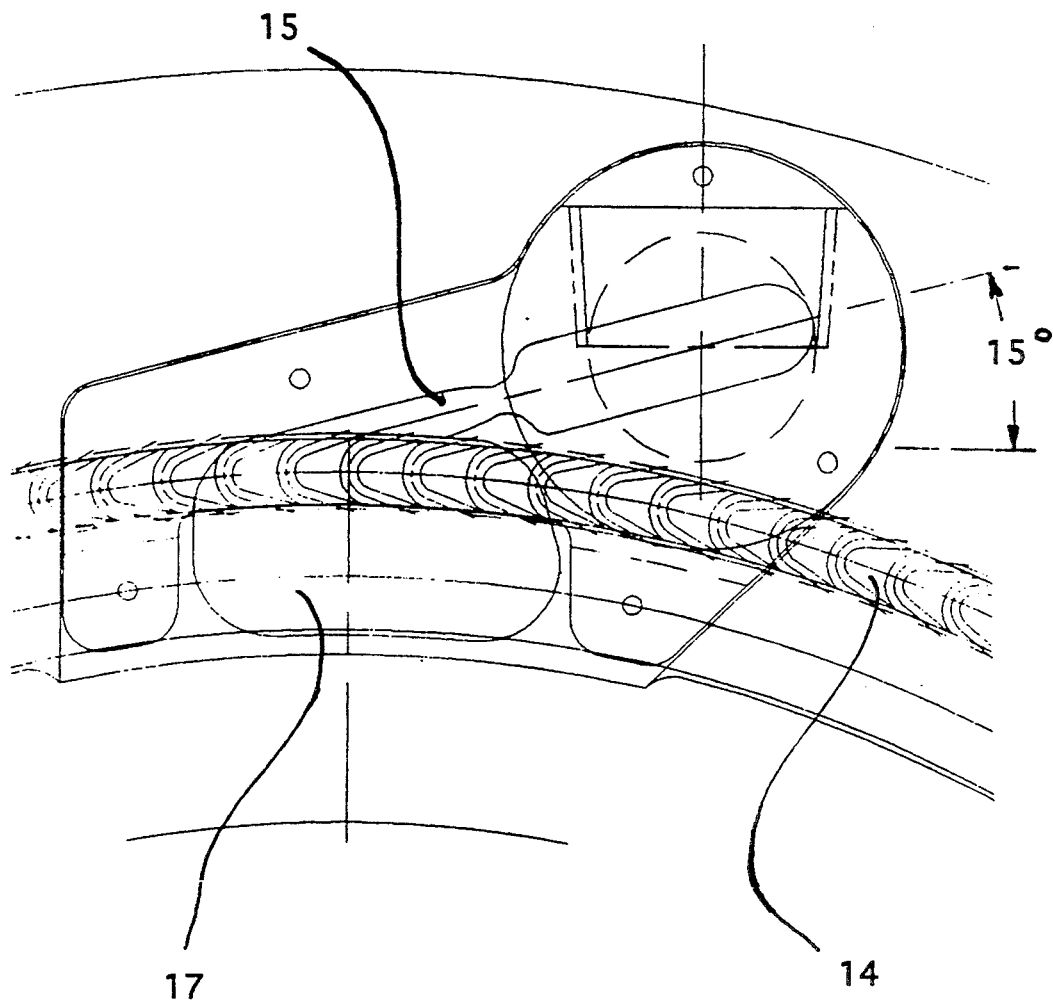
FIG. 3 is an enlargement of the turbine nozzle and some of the blades.

Turbine exhaust channel 17 is preferably positioned 180 degrees opposite of the exhaust pipe 25 for purpose of minimizing the external emission of the turbine generated noise as shown in FIG. 2. All the turbine exhaust air exiting the exhaust channel 17, mixes with the blower air flow in the exhaust passage 42 and exits together with the blower flow through the exhaust pipe 25.

While the above description contains many specificities, the reader should not construe these as limitations on the scope of the invention, but merely as exemplifications of preferred embodiments thereof. For example, persons skilled in the art could design blowers using the teachings of this inventions with different dimensions and power levels. The specified preferred angle of 15 degrees between the blade circle tangent and the nozzle centerline could be varied between 10 degrees and 30 degrees with appropriate other design modifications known to those skilled in the turbine art. The blower-turbine wheel can be cast of suitable high-strength plastic using an injection molding process. Also, the blower-turbine wheel could be cast in two separate pieces and those two pieces shrunk fit together. For higher powered blower more than one nozzle could be utilized. They could be positioned close together and at about 180 degrees relative to the exhaust pipe in a manner similar to the example shown in the drawings. Those skilled in the art will envision many other possible variations are within its scope. Accordingly the reader is requested to determine the scope of the invention by the appended claims and their legal equivalents, and not by the examples which have been given.

I claim:

1. An electro-pneumatic blower comprising:
    a) a blower housing,
    b) an electric motor comprising a shaft defining an external shaft portion, said motor being mounted on said blower housing,
    c) a blower-turbine wheel mounted on said external shaft portion, said wheel comprising a number of relatively centrifugal blower blades defining an average blower blade size and a large number of relatively small compressed air turbine blades,
    d) at least one compressed air turbine nozzle positioned within said housing to direct a flow of compressed air toward said relatively small compressed air turbine blades.
    said large number of relatively small turbine blades being at least 5 times the number of blower blades, and
    said relatively small turbine blades defining an average turbine blade size equal to less than 20 percent of said average blower blade size.

2. An electro-pneumatic blower as in claim 1 wherein:
    a) said compressed air turbine nozzle defines a nozzle centerline,
    b) the positions of the outer edge of said plurality of said compressed air turbine blades define a blade circle, said blade circle defining a nozzle tangent to said blade circle where said centerline intersects said blade circle,
    c) the acute angle formed by the intersection of said nozzle tangent and said nozzle centerline defines a nozzle angle, and
    d) the nozzle angle is between 10 degrees and 30 degrees.

3. An electro-pneumatic blower as in claim 2 wherein said nozzle angle is about 15 degrees.

4. An electro-pneumatic blower as in claim 1 wherein:
    a) air blown by said blower blades defines blower air and compressed air passing through said turbine blades defines turbine exhaust air,
    b) said housing comprises a toroidally shaped exhaust duct into which (i) blower air is blown at all locations around the circumference of said duct and (ii) turbine exhaust air is exhausted at a single location defining a turbine exhaust location within said duct, and
    c) said housing further comprises an exhaust pipe intersecting said toroidal exhaust duct at a blower exhaust position on said toroidally shaped exhaust duct located approximately 180 degrees opposite said turbine exhaust location.

5. An electro-pneumatic blower comprising:
    a) a blower housing,
    b) an electric motor comprising a shaft defining an external shaft portion, said motor being mounted on said blower housing,
    c) a blower-turbine wheel mounted on said external shaft portion comprising a plurality of centrifugal blower blades and a plurality of compressed air turbine blades,
    d) at least one compressed air turbine nozzle positioned within said housing to direct a flow of compressed air toward said compressed air turbine blades; wherein said blower-turbine wheel including both sets of blades is a single aluminum casting.

6. An electro-pneumatic blower comprising:
    a) a blower housing,
    b) an electric motor comprising a shaft defining an external shaft portion, said motor being mounted on said blower housing,
    c) a blower-turbine wheel mounted on said external shaft portion comprising a plurality of centrifugal blower blades and a plurality of compressed air turbine blades,
    d) at least one compressed air turbine nozzle positioned within said housing to direct a flow of compressed air toward said compressed air turbine blades;
wherein said blower-turbine wheel including both sets of blades is a single plastic casting.

* * * * *